Figure 1:
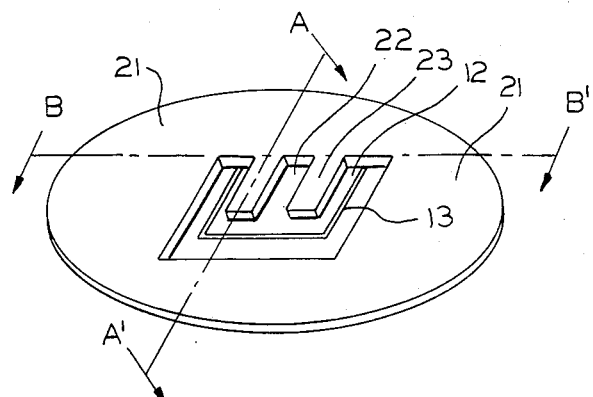

United States Patent [19]

Itano et al.

[11] Patent Number: 4,654,676
[45] Date of Patent: Mar. 31, 1987

[54] VALVE ELEMENT FOR USE IN AN INK-JET PRINTER HEAD

[75] Inventors: Tsutomu Itano; Mitsuo Tsuzuki, both of Tokyo, Japan

[73] Assignee: NEC Corporation, Japan

[21] Appl. No.: 724,099

[22] Filed: Apr. 17, 1985

[30] Foreign Application Priority Data

Apr. 18, 1984 [JP] Japan .................................. 59-77746

[51] Int. Cl.⁴ ............................................. G01D 15/16
[52] U.S. Cl. ................................. 346/140 R; 137/845; 137/855; 137/513.5; 156/661.1
[58] Field of Search ................... 346/140, 75; 137/855, 137/845, 513.5; 156/661.1, 656

[56] References Cited

U.S. PATENT DOCUMENTS 4,487,662 12/1984 Fischbeck ........................ 346/140 X
4,514,742 4/1985 Suga ..................................... 346/140

*Primary Examiner*—Joseph W. Hartary
*Attorney, Agent, or Firm*—Laff, Whitesel, Conte & Saret

[57] ABSTRACT

A valve for an ink jet printer is made by vacuum depositing, sputtering, and plating various layers of metal on a glass substrate. A photoresist and etch technique is used to form a window area in one of the layers and a fine slit for forming a tongue in another of the layers within the window area. When the window area is formed, an elongated projection remains in the window area to prevent the tongue from bending in one direction while enabling it to bend in an opposite direction. This way ink pressure on one side opens the valve and pressure on the opposite side choses the valve.

10 Claims, 14 Drawing Figures

VALVE ELEMENT FOR USE IN AN INK-JET PRINTER HEAD

This invention relates to micro mechanical valves, and more particularly, to valve elements which are suitable for use in an ink-jet printer head for jetting ink droplets responsive to the pump action caused by the interaction between electromechanical conversion means and a valve for supplying the ink.

Conventional valve elements for ink-jet printer heads have been described in the U.S. patent application Ser. No. 274,210 filed on June 16, 1981 now abandoned, and refiled Mar. 30, 1983 as continuation Ser. No. 480,088, now U.S. Pat. No. 4,514,742. The conventional valve element is constituted by a disc-like valve seat having a cylindrical ink passage at its center. A valve element is positioned over the seat to support a disc-like valve at the center, the support being provided by arms around the valve and by a ring-like portion. When the pressure of the ink acts upon the valve from the ink passage side, the valve is pushed up and the ink flows out through the gap between the valve and the valve seat. When the ink pressure acts in the reverse direction, however, the valve is pushed against the valve seat, cutting off the flow of the ink.

The diameter of the valve is greater than the diameter of the ink passage. This difference in diameter is preferably as small as possible in order to facilitate the ink flow in the forward direction. This means that a high degree of accuracy is necessary in superposing the valve seat and the valve component. Accordingly, the assembly of the valve element is difficult. The manufacturing yield of acceptable valve elements is low and the variation of the valve characteristics is great.

In order to resolve this problem, a single-unit type valve element for use in an ink-jet printer head had been describe in the U.S. patent application Ser. No. 561,633 filed on Dec. 15, 1983 now abandoned. The single-unit type valve element includes a valve seat having a fine hole for enabling a passage of fluid ink. A valve seat is formed by use of a photoelectroforming technique. A support portion supports a valve for covering the hole and for displacing the valve in response to the pressure of ink. A valve fixing portion is attached to the support portion of the valve seat. The valve, the support portion, and this fixing portion are formed on the valve seat in order to integrate the valve seat, valve, support portion, and fixing portion, as a single unit.

In a production process for making the single-unit type valve element, however, an extremely high accuracy of several microns is necessary in forming the valve on the valve seat. Accordingly, the manufacturing yield of acceptable valve elements is still low. Therefore, the production method is not suitable for mass and economical production of a large number of valve elements.

Moreover, since the conventional valve elements have overlapping portions between the valves and the valve seats, it is easy to collect dust at the overlapping portions.

It is, therefore, an object of this invention to provide a valve element for use in a ink-jet printer head which is suitable for mass and economical production.

According to this invention, a valve element for use in an ink-jet printer head includes a valve member in the form of a flat plate. The valve member is composed of a flat member and a tongue portion separated from the plate member by a fine slit. A valve seat is composed of a flat plate portion, an opening portion provided at substantially the center of the valve seat, and a stopper member projecting into the opening portion. The valve seat is formed on the valve member so that the stopper member projecting into the opening portion of the valve seat is faced with the tongue portion of the valve member.

Figure 2A:
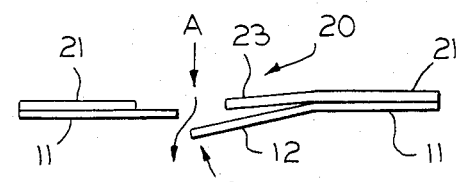
Figure 2B:
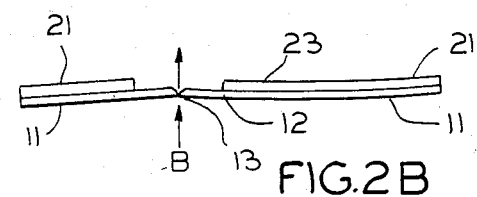
Figure 3A:
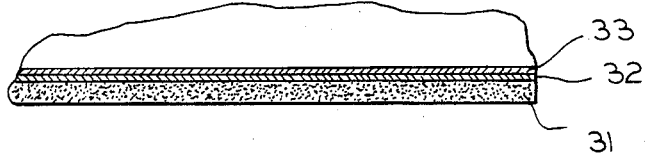
Figure 3B:
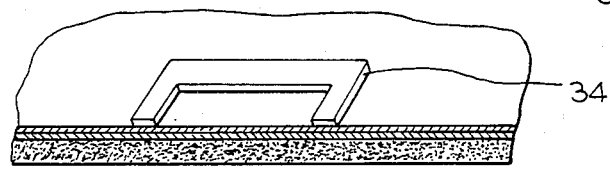
Figure 3C:
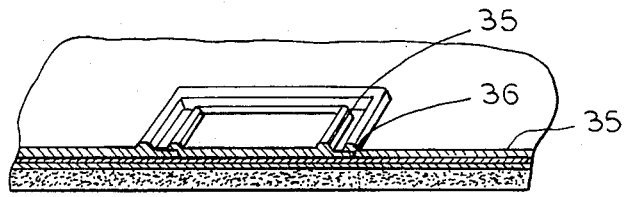
Figure 3D:
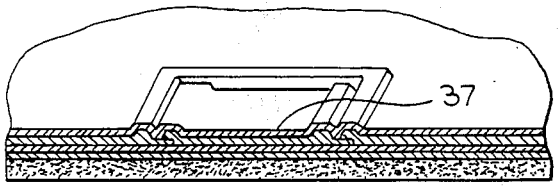
Figure 3E:
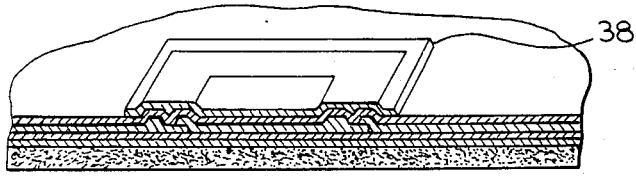
Figure 3F:
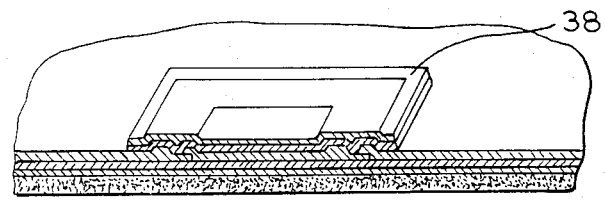
Figure 3G:
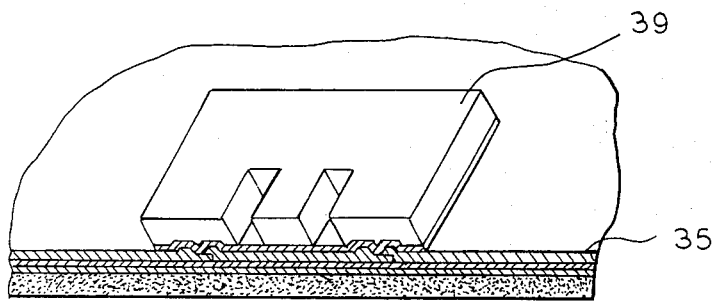
Figure 3H:
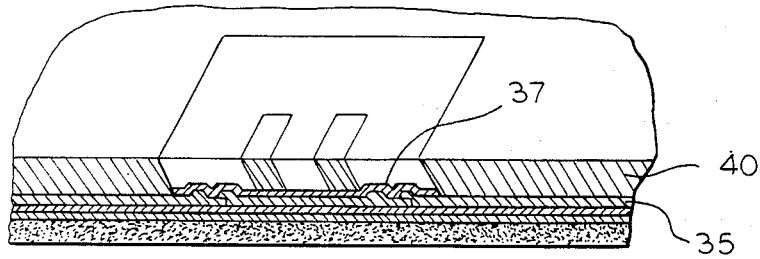
Figure 3I:
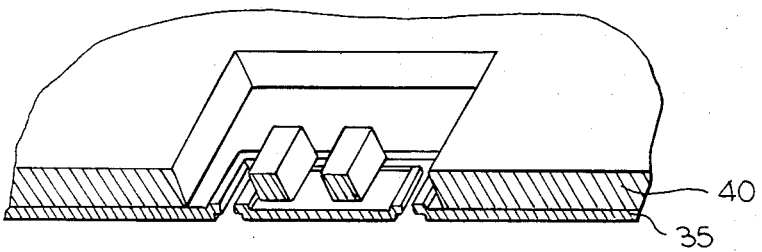
Figure 4:
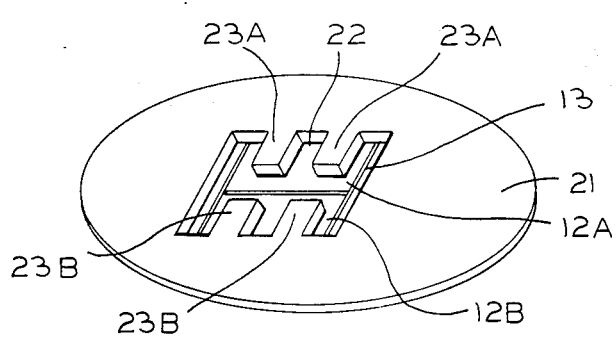
Figure 5:
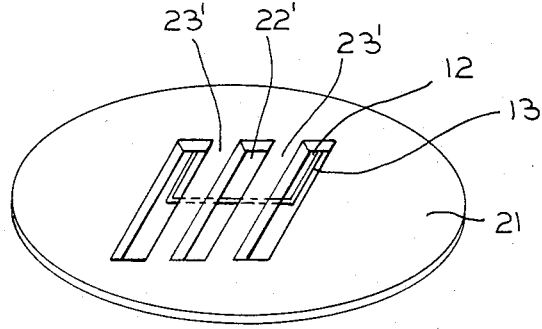

Other features and advantages of this invention will be apparent from the following description of preferred embodiments taken in conjunction with the accompanying drawings, wherein:

FIG. 1 is a perspective view of a first embodiment of this invention;

FIGS. 2(A) and 2(B) are cross sectional views of the first embodiment of this invention;

FIGS. 3(A) to 3(I) are cross sectional views for illustrating a method of producing the valve element according to the first embodiment of this invention; and FIGS. 4 and 5 are perspective views of second and third embodiments of this invention, respectively.

In FIGS. 1 and 2, the first embodiment comprises a valve member 10 in the form of a flat plate. The valve member 10 is composed of a plate member 11 and a tongue portion 12 which is separated from the plate member 11 by a fine slit 13, whereby the tongue portion 12 is movable in a vertical direction, as seen in FIGS. 2(A) and 2(B). A valve seat 20 has a thickness of several microns and is composed of a flat plate portion 21, an opening portion 22 which is provided at its center, and stopper members 23 projecting into the opening portion 22. The valve member 10 and the valve seat 20 are positioned so that the stopper members 23 are faced with the tongue portion 12.

The valve member 10 and the valve seat 20 are formed by means of a photoelectroforming technique including a combination of a patterning technique using a photoresist and plating technique. Corrosion-resistant metals, such as nickel, chromium, aluminum, and the like, are suitable for use as the metallic materials for the valve member 10 and the valve seat 20.

The tongue portion 12 is formed by separating its three sides from the plate member 11 by means of the fine slit 13 without cutting the remaining one side, whereby the tongue portion 12 is movable about the non-separated side in the vertical directions A and B in FIGS. 2(A) and 2(B). The stopper members 23 limit the movement of the tongue portion 12 as shown in FIG. 2(B).

When a pressure is applied in a forward direction A as shown in FIG. 2(A), the tongue portion 12 of the valve member 10 is moved downward, to enable a flow of a predetermined amount of the ink. When the pressure is reversed, that is, the pressure is applied in the reverse direction B as shown in FIG. 2(B), the tongue portion 12 is moved upward and stopped by the stopper members 23. As a result, only a small amount of ink flows through the fine slit 13.

In the first embodiment, an example of the valve element suitable for an ink-jet printer head is as follows:

the thickness of the tongue portion 12 (valve member 10): 4 $\mu$m the length of the tongue portion 12: 200 $\mu$m the width of the tongue portion 12: 600 $\mu$m the width of the fine slit 13: less than 1 $\mu$m When the pressure of 0.5 atmospheric pressure is applied, the ink flow is obtained at 25 mm$^3$/sec in the forward direction A, and at 2 mm$^3$/sec in the reverse direction B, to obtain a forward-reverse ratio higher than 10. It is experimentally confirmed that the ink-jet printer head has operated at a high droplet-forming frequency of 10 KHz.

FIGS. 3(A) to 3(I) shows the production process for making the valve element according to the first embodiment. As shown in FIG. 3(A), on a substrate 31 such as a glass, a first metallic layer 32 of a metal having a high conductivity and adhesive characteristic, such as chromium and aluminum is formed by means of a vaccum deposition or sputtering technique. A second metallic layer 33 of a metal such as nickel or chromium is formed on the first metallic layer 32 by means of a vacuum deposition or sputtering technique. The metal for the second metallic layer 33 is the same as or may be applied as a plating metal, which will be described below.

Next, as shown in FIG. 3(B), a first resist pattern 34 for use in forming the fine slit 13 (FIGS. 1 and 2) is formed by means of a photolithograph technique. Then, a first plating layer 35 of the plating metal such as nickel or chromium is formed at a portion, except for the first resist pattern 34, so that the plating thickness is greater than the thickness of the first resist pattern 34. The plating layer is grown from both sides of the first resist pattern 34 to form a fine gap 36, as shown in FIG. 3(C).

Then, as shown in FIG. 3(D), a third metallic layer 37 of metal, such as aluminum, which is capable of selective-etching on the first metallic layer 31 is formed on the whole surface by means of vacuum deposition or a sputtering technique. Next, as shown in FIG. 3(E), a second resist pattern 38 is formed by means of photolithograph technique. The second resist pattern 38 is used for forming a spacer for separating the tongue portion 12 of the valve member 10 from the stopper members 23. In the next step, as shown in FIG. 3(F), except for a portion covered by the second resist pattern 38, the third metallic layer 37 is removed by means of an etching technique. Then the second resist pattern 38 is removed.

In the following step, as shown in FIG. 3(G), a third resist pattern 39, having a thickness of 40 to 50 μm, is formed by means of LAMINAR-AX marketed by DYNACHEM Corporation. This step is or forming the valve seat 20 by means of the electroforming technique. The opening portion 22 has a uniform thickness. Then a second plating layer 40 is formed with a thickness which is substantially equal to the thickness of the third resist pattern 39. The second layer is formed over the whole surface except for the portion covered by the third resist pattern 39, as shown in FIG. 3(H).

In the final step, the portions unnecessary for the valve element are removed as shown in FIG. 3(I). More specifically, the glass substrate 31 is removed by dissolving it by the use of hydrofluoric acid. The third resist pattern 39 is removed by dissolving it by the use of ALKASTRIP-99A marketed by DYNACHEM Corporation. The third and first metallic layers 37 and 32 are removed and then the second metallic layer 33 is removed by means of a selective-etching technique. In this case, even when the same metal is used as the metals for the first and second plating layers 35 and 40 and the second metallic layer 33, the second metallic layer 33 can be removed without affecting to the first and second plating layers 35 and 40 by using a difference in material and thickness. Finally, the first resist layer 34 is removed and then a washing is performed.

Referring to FIGS. 4 and 5, there are shown the second and third embodiments, respectively. The second embodiment comprises first and second confronting tongue portions 12A and 12B which are positioned symmetrically in a somewhat "H-shaped" or "double H-shaped" opening. First and second two-stopper members 23A and 23B are provided in correspondence to the first and second tongue portions 12A and 12B, respectively.

The third embodiment comprises three spaced parallel opening portions 22' and two spaced parallel stopper members 23' dividing the opening portions 22'. The stopper members 23' ensure the stopping operation.

What is claimed is:

1. A valve element for use in an ink-jet printer head, said valve element comprising:
   a valve member having a plate member, a tongue portion and a fine slit which opens to form or closes to block an ink passageway, said tongue portion being separated from said plate member by said fine slit, said tongue member being movable to open or close said fine slit passageway; and
   a valve seat having a flat plate portion, an opening portion and a stopper member for limiting tongue movement when said fine slit passageway is closed, said slit being positioned within an area of said opening portion, said stopper member projecting into said opening portion, said stopper member overlying and confronting said tongue portion of said valve member.

2. A valve for an ink-jet printer, said valve comprising a laminate of a flat plate portion with a plate member integrally joined thereto in a face-to-face relationship, an open portion formed in said flat plate portion in order to provide a window area above said plate member, a fine generally U-shaped slit in said open portion of said plate member to form an ink passageway between said plate and a tongue in said window area, and stopper means extending from said plate portion into said window area and overlying and confronting said tongue to enable said tongue to move to an open passageway position responsive to fluid pressure on one side and to in a closed passageway position responsive to fluid pressure on the opposite side.

3. The valve of claim 2 wherein said window are in said flat plate portion is formed into at least one somewhat U-shaped opening to define at least one elongated member integral with said flat plate portion, said elongated member projecting into said window area to form said stopper means.

4. The valve of claim 3 wherein there are at least two spaced parallel ones of said elongated members of said flat plate portion projecting into said window area.

5. The valve of claim wherein said window area has at least one generally H-shaped opening to define at least two confronting elongated members of said flat plate portion, said elongated members projecting into said window area to form said stopper means.

6. The valve of claim 5 wherein there are two sets of confronting elongated members of said flat plate portion, said elongated members projecting into said window area to form said stopper means.

7. The valve of claim 2 wherein said window area comprises a plurality of spaced parallel, elongated open portions in said window area, said open portions separating a plurality of spaced parallel solid members forming said stopper means.

8. The valve of claim 2 wherein said plate portion and said plate member are made of a material taken from the group of nickel, chromium, and aluminum.

9. A method of making the valve of claim 2 comprising the steps of:
(a) forming a substrate of glass,
(b) depositing a first layer of a first metal with a highly conductive and a good adhesive quality on said glass substrate,
(c) forming a second layer of a second metal by plating over said first layer,
(d) using photoresist to form said fine slit,
(e) plating over said second layer with said second metal whereby said photoresist preserves a relatively thinner second layer,
(f) forming a third metallic layer over the entire surface, said third metallic layer being capable of selectively etching the first metallic layer,
(g) forming a second photoresist to provide a spacer for separating the tongue portion from the stopper means,
(h) etching to remove said third layer except where protected by said photoresist;
(i) forming a third photoresist pattern of a valve seat having an opening adjacent said fine slit;
(j) forming a second plating layer over the third photoresist pattern; and
(k) removing said glass substrate and said third photoresist pattern.

10. The valve of claim 9 wherein said plate portion and said plate member are made of a material taken from the group of nickel, chromium, and aluminum.

* * * * *